United States Patent Office 3,231,387
Patented Jan. 25, 1966

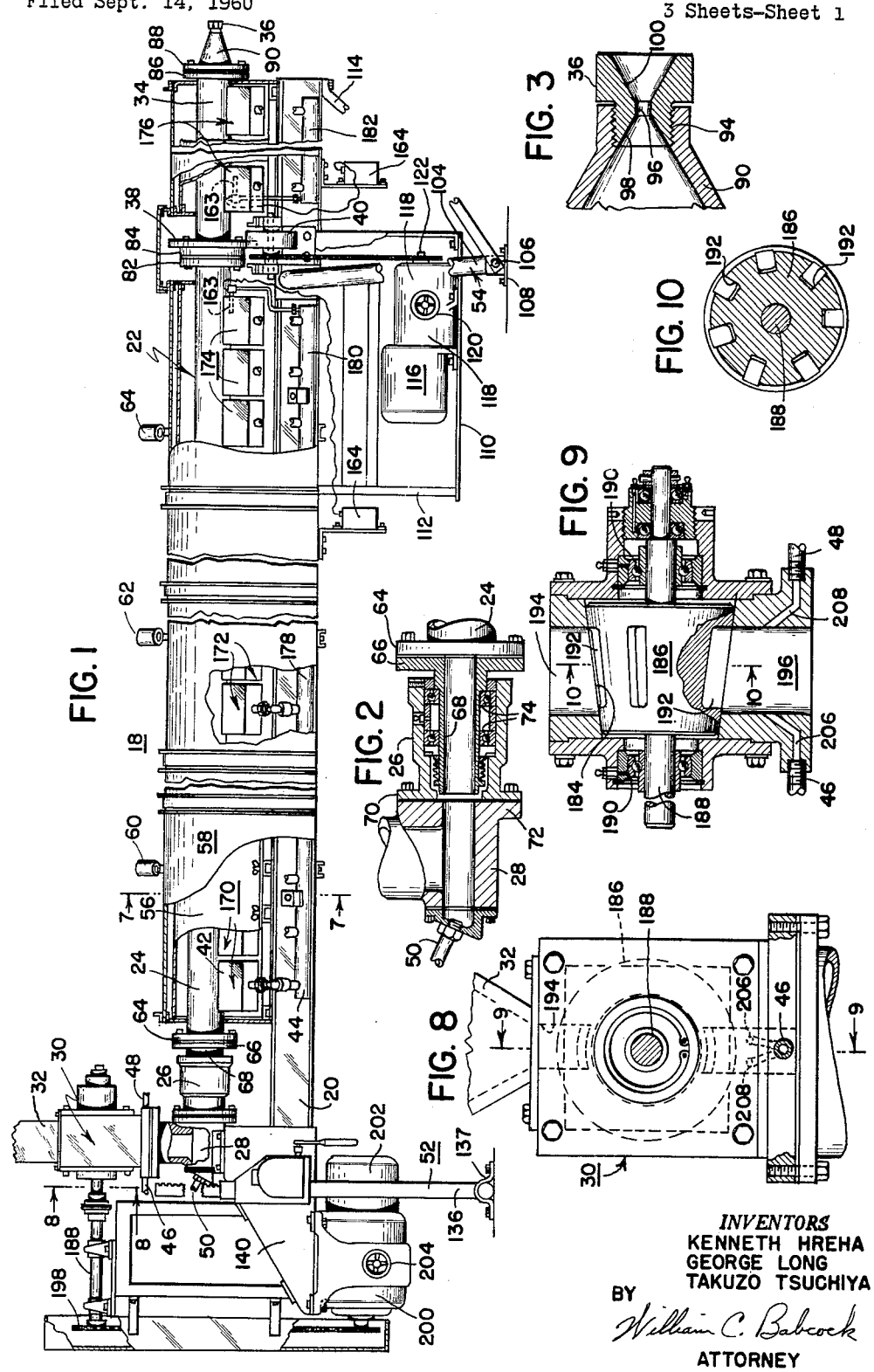

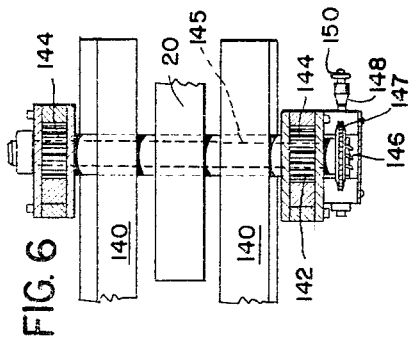
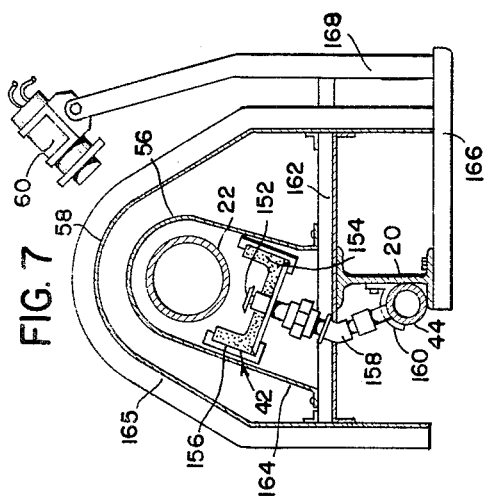
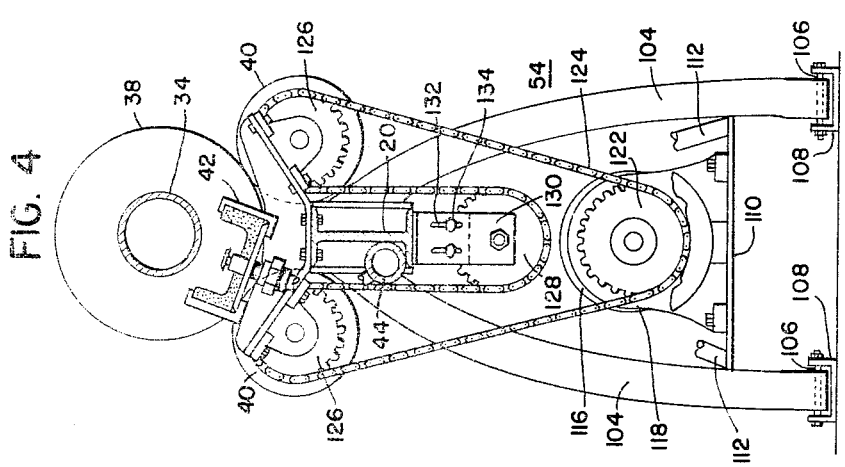
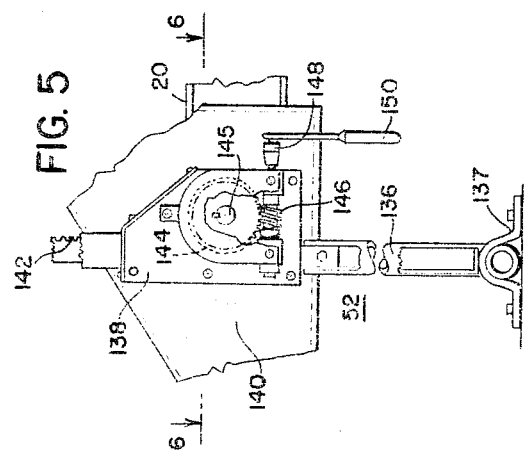

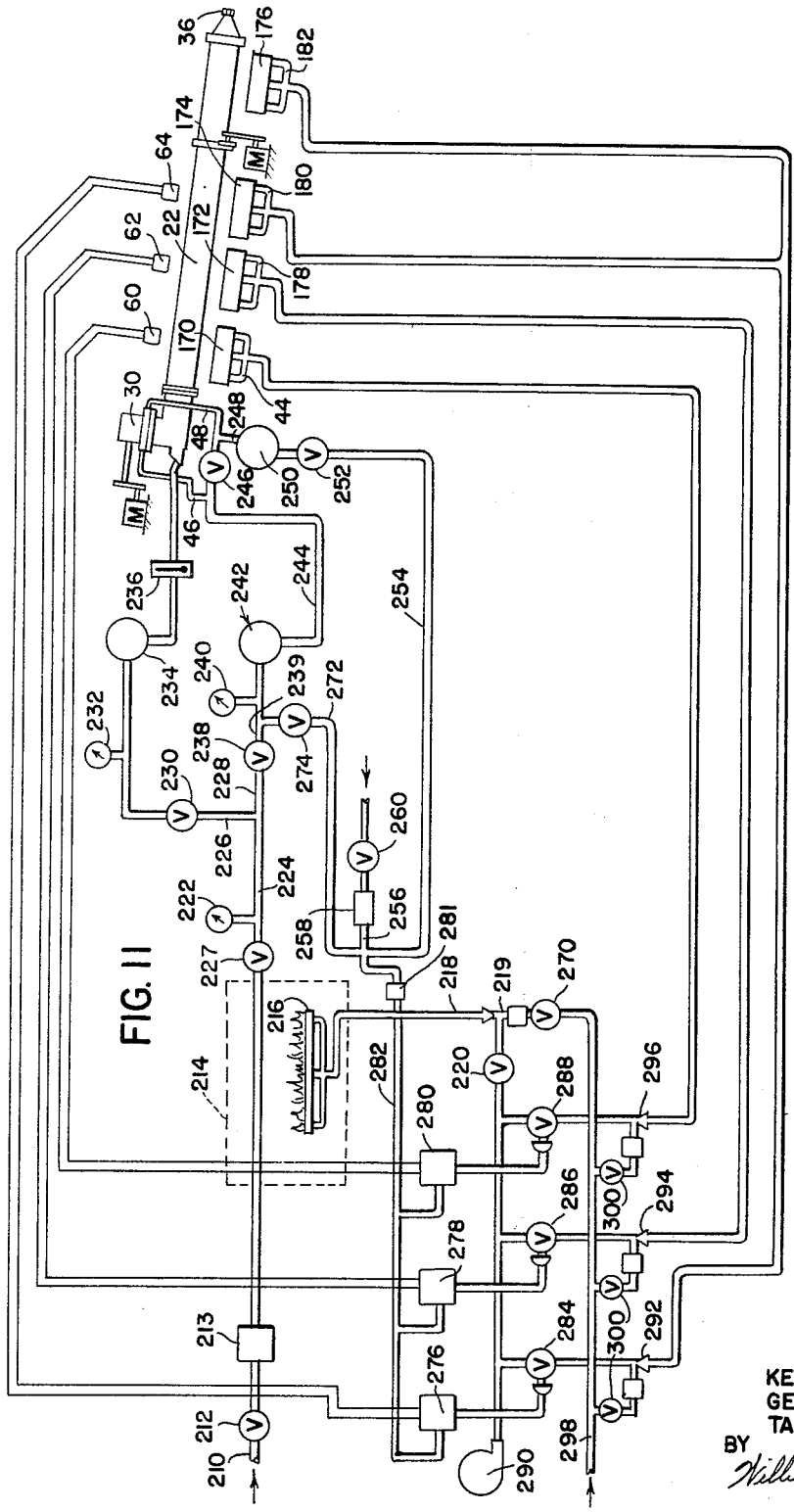

1

3,231,387
METHOD AND APPARATUS FOR CONTINUOUS PUFFING
Takuzo Tsuchiya, St. Louis Park, George Long, Minneapolis, and Kenneth Hreha, Robbinsdale, Minn., assignors to General Mills Inc., a corporation of Delaware
Filed Sept. 14, 1960, Ser. No. 56,046
14 Claims. (Cl. 99—82)

This invention relates to methods and apparatus for the continuous processing and puffing of a variety of materials, and is particularly useful for the final cooking and puffing of preformed cereal dough bodies or pellets.

Various methods and devices have been suggested in the prior art for puffing many different materials. Thus puffing guns have been used for many years in the puffing of whole grains such as rice and wheat, as well as for the puffing of other materials, for example to form expanded materials suitable for use as building material, insulation and the like. Some of these prior suggestions have involved operation on a batch basis and others on a continuous basis.

We have found, however, that there is a need for improved methods and apparatus which not only provide continuous puffing of various materials, but also provide for greater possibilities of variation in other processing effects in conjunction with such puffing. In the food field, in particular, pre-formed cereal dough bodies or pellets have been previously puffed on a batch basis, but we are not aware of prior methods and equipment which can successfully puff such pre-formed dough items on a continuous basis, and which can also provide other desired cooking or processing variations in conjunction with such puffing.

It is accordingly one object of the present invention to provide improved methods and apparatus for the continuous processing and puffing of various materials with selective control of different types of energy transfer to achieve desired processing variations.

Another object is the provision of improved methods and apparatus for the continuous processing and puffing of various materials by maintenance of a controlled condition of fluid turbulence for initial energy transfer in a pressurized processing zone, and preferably with the transfer of further processing energy by conduction from a solid surface, by radiation, or both, as the material moves through such zone to a puffing orifice.

A further object is the provision of an improved method and apparatus for continuous puffing in which provision is made for individual control of the relative processing effects of one or more variables such as residence time or rate of movement of the material through a processing zone, type of processing fluid, fluid turbulence, fluid pressure and fluid temperature within such a zone, surface conduction and radiation temperatures at selective regions along a processing zone, and angular orientation and speed of rotation of an inclined tubular processing unit or puffing gun barrel.

Still another object is the provision of improved methods and apparatus for continuous puffing capable of application to many different materials, but especially adapted to the continuous cooking and puffing of preformed dough bodies.

2

Other objects and advantages will be apparent from the following specification in which various embodiments of the invention are described. Briefly, the foregoing objects may be accomplished from a method standpoint by feeding the desired materials into a pressurized processing zone into which at least one gaseous processing fluid is introduced at a location providing immediate contact with the material which enters the zone, maintaining the processing fluid in a turbulent condition at the location of initial contact to increase its effective initial action on the material, and ejecting the material from the pressurized processing zone through a continuously open puffing orifice. Preferably the processing fluid, or two such fluids, should be introduced into the zone in at least two separate streams, one of which may have a directional component which helps move the material through the puffing zone, but the other of which should have its major effect in a direction providing a mixing action with the first stream to provide a desired degree of turbulence. Thus, the division of processing fluid between the two inlets can be varied selectively to control the relative turbulence and processing effects.

The preferred method also contemplates the additional transfer of energy to or from the material by conduction, e.g. through contact of the material with a heated surface in the processing zone, or by radiation, or a combination thereof, and the selective control of such factors as the residence time within the zone, and the conduction or radiation temperatures at different points along the zone to achieve further desired processing variations. When superheated steam is used as the turbulent processing fluid, the controlled turbulence especially promotes the more rapid initial transfer of heat from the fluid to particles of colder material entering the zone. We believe this quicker initial heating is at least partly attributable to the release of energy through phase changes during condensation of such fluid on the surface of the material.

The control of these factors is particularly helpful in the processing of pre-formed dough bodies in which initial contact with a turbulent heated processing fluid provides a quick initial cooking, while the further radiation and conduction provide additional cooking, browning, or toasting. Thus such factors as color, crispness, flavor and the like can be varied to meet the requirements of a particular product.

From an apparatus standpoint, the foregoing objects may be accomplished by feeding the materials through an elongated cylindrical puffing gun inclined slightly downwardly from the horizontal. The gun is rotated on its cylindrical axis and is heated to provide a high temperature surface for transfer of heat by both radiation and direct contact with the material. The device is also supplied with means for introducing at least one gaseous processing fluid such as steam or air within the processing zone in a condition of turbulence.

The material is discharged from the cylindrical puffing gun barrel through a continuously open discharge nozzle and is carried through such nozzle largely by the escape of the fluid medium. The linear velocity of such fluid medium through the gun barrel is slower, however, because of the larger barrel diameter, than the velocity needed for pneumatic transport of the material through the barrel. Thus greater control of residence time, and of the relative processing effects can be achieved. Provision is made for adjustment of one or more of the other apparatus features stated in the foregoing objects, as described in detail in the following specification.

In the drawings forming a part of this application:

FIG. 1 is a side elevation of a continuous puffing gun embodying features of the invention;

FIG. 2 is a partial enlarged view of a portion of the inlet end of the device of FIG. 1, showing details on one fluid inlet, and of the rotary joint and bearing for the inlet end of the rotary gun barrel;

FIG. 3 is a partial enlarged view of the discharge cone and nozzle of the puffing gun of FIG. 1;

FIG. 4 is a sectional view on the line 4—4 of FIG. 1 showing details of the mechanism for rotating, supporting and heating the gun barrel;

FIG. 5 is an enlarged partial view of the adjustable support for the inlet end of the device of FIG. 1;

FIG. 6 is a partial view on the line 6—6 of FIG. 5;

FIG. 7 is an enlarged sectional view on the line 7—7 of FIG. 1 showing further details of the burner arrangement, covers and temperature control mechanism of the unit;

FIG. 8 is an enlarged partial view on the line 8—8 of the inlet valve assembly of the device of FIG. 1;

FIG. 9 is a sectional view on the line 9—9 of FIG. 8;

FIG. 10 is a partial sectional view on the line 10—10 of FIG. 9; and

FIG. 11 is a schematic diagram of certain elements and controls for the puffing gun of FIG. 1.

As shown in FIG. 1, a continuous puffing gun embodying features of the present invention is designated generally at 18. It includes a suitable frame 20 on which a relatively long cylindrical puffing gun barrel 22 is mounted for rotation on its longitudinal axis. The inlet end 24 of the gun barrel is connected to and rotatably supported by a rotary bearing and joint 26 secured to a fixed inlet housing 28. A rotary valve assembly 30 receives the desired material to be puffed through a suitable hopper or feeder 32, and discharges the material into the inlet casing 28, while providing a pressure seal between the interior of casing 28 and hopper 32.

At the discharge end 34 of the gun barrel 22 a suitable discharge nozzle 36 is provided, through which material is adapted to be continuously discharged and puffed or expanded as it passes from the higher pressure interior of the gun barrel to the atmospheric pressure outside the nozzle.

The barrel 22 carries a circular driving flange 38 which rests on two driving rollers 40 by means of which the barrel 22 is rotated on its longitudinal axis at a desired operating speed. The rotating barrel is heated by one or more burner units 42 which are shown as gas burners connected to a suitable gas manifold 44.

The inlet casing 28 and valve assembly 30 are provided with a plurality of inlet means 46, 48 and 50 for the selective introduction of one or more desired gaseous processing fluids. The gun assembly and its frame 20 are mounted on suitable supports 52 at the inlet end and 54 at the outlet end, said supports being adjustable in a manner to be described, for variation in the angular orientation of the gun barrel axis with reference to the horizontal.

The rotating barrel and burner assemblies may be enclosed in appropriate casings such as the inner cover 56 and outer cover 58 of FIG. 1. Appropriate radiation pyrometers or other temperature sensing units 60, 62 and 64 are located at different processing regions along the gun barrel to sense the surface temperature of the barrel at such spaced regions for purposes of control as described below.

The rotary bearing and joint 26 by which the inlet end 24 of the puffing gun barrel is supported for rotation is shown in further detail in FIG. 2. The inlet end 24 of the gun barrel 22 carries a circular flange 64 suitably bolted to the flange 66 carried by the rotary inner member 68 of the joint assembly.

The stationary outer housing 26 of this rotary bearing and joint is secured by its flange 70 to a flange 72 on the inlet housing 28. As shown in FIG. 2, the arrangement of the bearings, and the relative sizes and locations of the parts, provide a smooth conduit for the material to be processed, as such material leaves the casing 28 and enters the rotary inner bearing tube 68 and the inlet end 24 of barrel 22. Suitable bearing races 74 provide for the support and rotation of these parts. Inlet housing 28 is supported by the frame 20.

While the discharge end 24 of the gun barrel 22 could be an integral part of the barrel, it is shown in FIG. 1 as a separate extension which is joined to the main gun barrel 22 by flanges 82 and 84 on the barrel 22 and extension 34, respectively. At the outer end of the outlet extension 34 a circular flange 86 is provided for attachment of a corresponding flange 88 on a discharge cone 90. Cone 90 is internally threaded at its outer end for assembly with the external threads 94 of nozzle member 36. The provision of a separable nozzle member 36 permits the convenient substitution of nozzles of different orifice size, for optimum puffing action with various materials.

As shown in FIG. 3, nozzle 36 has a restricted discharge orifice 96 with tapering cone-like surfaces 98 and 100 at the inner and outer portions of the orifice. The inner surface 98 is shown as a smooth continuation of the inner surface of discharge cone member 90. The outwardly flaring cone portion 100 at the discharge side of orifice 96 provides a smoother transition for the material discharged from the orifice to the external atmosphere and assists in preventing damage to individual pieces of material. The size of orifice 96 is chosen to permit the desired quantity of material to pass rapidly and freely through it with escaping processing fluid, and to be puffed or expanded in size as it leaves the higher pressure region inside the orifice and suddenly reaches the lower outside atmospheric pressure.

The discharge end of the gun assembly is supported and driven as shown in detail in FIGS. 1 and 4. The supporting and driving assembly 54 includes supporting legs 104 at each side of the assembly which have their upper ends securely fixed to frame member 20. The lower ends of legs 104 are pivoted along a common transverse axis at 106 to suitable base plates 108 secured to the floor or foundation. The pivotal support at 106 permits the selective adjustment of the gun barrel axis to the desired degree below the horizontal, in response to adjustment of the vertical support assembly 52 at the inlet end of the gun, as further described below.

Secured to legs 104 is one end of a supporting platform 110 for the gun barrel drive motor 116. Platform 110 has its other end secured by appropriate braces 112 to frame member 20. The motor 116 drives a variable speed gear box 118. An adjusting member 120 permits adjustment of the gear ratio to provide the desired variations in speed of rotation of the gun barrel.

The output shaft of gear box 118 has a driving sprocket 122 connected by chain 124 to driven sprockets 126 on the supporting and drive rollers 40. The driving chain also passes under an idler sprocket 128 supported on a bearing member 130 which can be adjusted vertically by means of slots 132 and bolts 134 with respect to frame member 20, in order to remove undesired slack from the chain. Idler sprocket 128 also keeps the central portion of the chain out of contact with the driving flange 30 or other elements of the gun assembly such as the burners 42.

The vertically adjustable support for the inlet end of the gun assembly is shown in detail in FIGS. 1, 5 and 6. Laterally spaced legs 136 have their lower ends secured in base plates 137 for limited tilting on a transverse axis parallel to the axis 106 of the front legs 104. The rear legs 136 extend vertically through a housing 138 secured to side plates 140 which are suitably fixed to the longitudinal frame member 20. Legs 136 carry vertical racks having teeth 142 for engagement by gears 144 secured to a common cross shaft 145. The gears are thus driven as a unit by engagement of a gear 147 on shaft 145 with a worm 146. Worm 146 is rotated in either direction by a ratchet drive 148 operated manually by handle 150. Rotation of worm 146 and gears 144 in response to operation of the handle will accordingly cause relative vertical movement of housing 138 with respect to the rack teeth 142 on legs 136. In this manner the vertical position of the inlet end of the gun may be selectively adjusted. During such adjustment, the gun assembly will pivot to the necessary limited extent around the transverse pivots 106 of the front support assembly. Hence any desired adjustment of the angular orientation of the gun barrel axis with respect to the horizontal may be obtained.

Further details of the burner and housing portions of the gun assembly are shown in FIG. 7. Here one of the individual burner units 42 is shown as including a central longitudinally extending burner section 152, with reflecting back and side sections 154 and 156, respectively, made of suitable materials such as silicone carbide. These back and side portions thus provide a trough-like reflector which assists in concentrating the heat from burner 152 against the gun barrel 22.

Burner unit 42 is held in position by the feed pipe 158 which supplies gas from manifold 44 to the burner section 152. Manifold 44 is secured to frame member 20 by clamps 160 to maintain the burner and manifold in assembled relation.

Cross frame members 162 and 166 secured to frame 20 provide support for inner and outer covers 56 and 58. The inner cover assists in retaining the heat from the burner units immediately around the gun barrel 22, while outer cover 58 effectively covers the entire assembly. Cross frame members 66 also provide support for members 168 which carry the temperature sensing units, such as 60. As shown in FIG. 7, the pyrometer unit 60 is mounted so that it is directed toward the axis of the gun barrel to receive and measure the radiation therefrom through suitable openings or windows (not shown) in the inner and outer covers.

According to a further feature of the invention, the temperatures at different regions along the processing zone can be individually adjusted for desired processing effects. For this purpose the various burner units 42 are connected in longitudinally spaced groups. Thus, one group 170 provides heat for the processing region of the gun barrel nearest the intake end 24. The next group of burners 172 provides heat for the next portion of the barrel, while further groups of burners 174 and 176 provide controllable heating units for the remaining sections of the gun barrel and its discharge extension. Each of these burner groups is provided with separate manifolds 44, 178, 180 and 182, respectively, to which gaseous fuel is separately supplied to maintain the desired temperatures, under individual control of the radiation pyrometers 60, 62, etc. The different burner groups may be ignited separately by suitable electric igniters 163 energized from transformers 164.

This arrangement of burners in separately controllable groups provides flexibility of operation by permitting maintenance of the same uniform temperature throughout all processing zones of the gun barrel or different operating temperatures at different selected processing zones of the barrel.

Further details of the inlet valve assembly are shown in FIGS. 1, 8, 9 and 10. The main valve housing 30, as shown in FIG. 9 has a tapered opening 184 in which a rotary valve member or plug 186 is supported for rotation on a valve shaft 188 carried by bearings 190. The rotary valve 186 is provided with material conveying pockets 192. These pockets are moved into alignment first with inlet passage 194 at the top of the valve body, to receive material from a feeder or hopper 32, and then with outlet passage 196 in the lower portion of the valve casing 30, to drop the material into the stationary inlet casing 38 of the gun assembly.

The rotary valve member 186 provides a pressure-tight seal between the higher pressures within the gun and the atmospheric or relatively lower pressures in the inlet hopper 32. Rotation of the valve at a predetermined rate will feed the desired quantity of material into the inlet casing of the gun at the selected volume rate. This rate is controlled by the speed of rotation of valve shaft 188 which is connected by sprockets and drive chain 198 (FIG. 1) to the variable speed gear assembly 200 driven by electric motor 202 supported on the frame. A manual control knob 204 provides for selective adjustment of the valve drive unit to obtain the desired speed of rotation for shaft 188 and valve 186.

According to an important feature of the invention, the gun includes means for establishing a condition of controlled turbulence for the gaseous medium within the processing zone. In the preferred form shown in FIG. 9, two inlets for the gaseous medium are shown at 46 and 48, communicating with discharge jets 206 and 208 within the valve body. As illustrated, these discharge jets are directed upwardly so that the fluid from them is discharged into the pockets 192 of the rotary feeder valve 186. Moreover, these jets are offset from each other (FIG. 8) in such a way that the gaseous fluid which enters the valve and intake assembly through them arrives in mixing and swirling streams which thus establish a turbulent condition. The action of the turbulent fluid insures the emptying or purging of material from the valve pockets and the quick initial transfer of energy between the fluid and the material. Thus when the device is used for the processing of pre-formed dough bodies, the controlled turbulence contributes to the quick transfer of heat from the fluid medium to such bodies for assisting the desired cooking action on the dough. It also prevents sticking of the dough bodies to each other or to the walls of the apparatus.

Additional processing fluid is also introduced to the intake housing 28 through the further inlet means 50 (FIGS. 1 and 2) which is located axially of the gun barrel 22 at the rear of the intake housing. Thus inlet 50 discharges its fluid in still another direction as compared to inlets 46 and 48, to assist in maintaining the desired turbulence. Here inlet 50 discharges at a downward angle along the gun barrel in a direction which helps to convey material dropping into the inlet housing 28 out toward the rotating gun barrel portion.

If, in fact, a sufficient volume rate of fluid were introduced through inlets 46, 48 and 50, it is conceivable that the material to be puffed could be conveyed solely by such fluid through the full length of the gun barrel to the puffing orifice. Such movement would be rapid, however, and would permit a lesser degree of additional processing by radiation or conduction, and little control over the residence time.

It is therefore desirable according to the present invention that the total mass or volume rate of introduction of gaseous processing fluid through all of the inlets which are used should, in relation to the gun barrel diameter, provide a linear velocity along the main body of the barrel which is lower than the velocity required for so-called "pneumatic" conveying of the material. (In using the term "pneumatic" we intend to include other gaseous fluids as well as air.) Thus the flow of processing fluid may contribute somewhat to the movement of the material at points other than the puffing orifice, but its primary use is to pressurize the zone for puffing, and to establish the desired conditions of controlled turbulence and energy transfer during processing prior to puffing. The fluid can also provide the desired amount of agitation of the pellets to prevent excessive contact of any one point of the pellet against the barrel.

The desired conveying movement of the material from the inlet to the outlet end of the gun is best achieved by a combination of the partial conveying action of the processing fluid together with the action of gravity caused by adjustment of the downward slope of the gun barrel and the speed of barrel rotation. The sliding and rolling of the material along the barrel is facilitated by the rotation of the barrel. Such rotation also tends to spread the material out in a thinner layer and to draw some of the material upwardly as one side of the barrel moves upwardly during rotation. Thus it is possible to adjust the apparatus in such a way as to change the relative processing contributions resulting respectively from contact of the the material with the turbulent fluid, from conduction during contact with the heated barrel, and from radiation from the heated barrel walls.

According to a further feature of the invention, we have provided means for changing the relative mass flow rates of processing fluid through the different inlets. We have also provided means for selective introduction of one or more different gaseous fluids at the respective inlet jets. These means are diagrammed schematically in FIG. 11.

First of all, when steam is desired as the gaseous fluid, it is provided from a suitable source of purified and strained steam which enters the system at 210 and passes through a main supply valve 212 and pressure regulator 213 to establish the desired inlet pressure. The steam is then fed through a super heater 214 of known construction. The super heater includes burner 216 supplied with fuel through a pipe 218 from a proportional mixer 219 connected through valves 220 to appropriate gas and air supply pipes. Beyond the super heater, the steam pressure is indicated by a gauge 222.

The super heated steam may then be conducted through pipe 224 and divided into two streams by pipes 226 and 228 controlled by valves 230 and 238. From valve 230, steam flows past pressure gauge 232, through a suitable flow meter and recorder 234, and temperature indicator 236 to the axial inlet pipe 50 of the puffing gun. The other branch from the main steam supply line passes from control valve 238 past gauge 240, flow meter and recorder 242 and pipe 244 to the inlet 46 associated with valve 30. A further extension of pipe 244 controlled by valve 246, connects with the other inlet means 48 of the valve 30 and gun assembly. Thus, if all of valves 221, 230, 238 and 246 are open, all three of inlets 46, 48 and 50 will be connected to the steam supply. Control of valves 230 and 238 can vary the division of steam between the axial jet 50 and valve purging and mixing jets 46 and 48 to vary the relative flow rates at these points.

The means for selective introduction of a different processing fluid is illustrated with compressed air as the gaseous fluid. An air supply pipe 248 is connected with inlet 48 just beyond valve 246. Air (suitably heated, if desired) is supplied to pipe 248 through a flow meter and recorder 250 by a valve 252 connected through pipe 254 to a compressed air supply 256. The compressed air for supply pipe 256 in turn is received through a suitable pressure regulator 258 and main supply valve 260 connected to a suitably filtered and regulated compressed air supply at 270. Thus if valves 252 and 260 are open, compressed air will reach the inlet 48. Depending on the open or closed position of valve 246, such air will either be the sole gaseous medium entering at 48, or may be mixed with steam coming through valve 246 at that point.

A further air supply connection is provided at 272 from the supply pipe 256 to a valve 274 which communicates with supply pipe 239 just beyond steam valve 238. If valve 238 is closed and valve 274 opened, the compressed air alone will be fed through pipe 244 to inlet 46. If valve 238 is opened and valve 274 is also opened, then a mixture of air and steam can be fed through pipe 244 to inlet 46.

Finally, if steam supply valve 221 is closed, and all of valves 230, 238, 246, 260 and 274 are opened, compressed air alone could be fed to all three of inlets 46, 48 and 50. Thus, the apparatus provides selective means for introduction of one or more desired gaseous fluids, in different relative mass flow rates, at the various axial flow and turbulence-creating jets of the gun.

As previously indicated, the invention also contemplates the selective control of different burner groups along the gun barrel for either uniform or different temperature conditions in their respective processing zones. For this purpose the radiation pyrometers 60, 62 and 64 are connected as shown in FIG. 11 to air operated controllers 276, 278 and 280, the air for which is supplied by pipe 282 through a pressure reducer 281 connected to the air supply pipe 256. These air operated controllers in turn control respective air valves 284, 286 and 288 which regulate the supply of air from a blower 290 for the air-gas fuel mixture of the burners. These air valves in turn communicate with proportional mixers 292, 294 and 296 to which gas is supplied from a low pressure gas supply line 298 through individual control valves or zero governors 300 of known construction. The proportional mixers in turn feed the desired air-gas fuel mixtures to the respective manifolds of burner groups 170, 172, 174 and 176 at volume rates determined by the sensings of the radiation pyrometers and the settings of the air operated controllers. In this connection it will be noted that burner groups 174 and 176 have been shown in FIG. 11 connected to operate as a single unit under control of pyrometer 62, although they could be operated separately with an additional pyrometer and air operated controller in the same manner as the other individual sections, if desired.

The method and apparatus features described herein provide flexibility in the selection of operating conditions to obtain a variety of processing effects with different materials. The advantages are particularly apparent in the processing of preformed dough bodies such as pellets, rings and flakes, which can be made from a wide variety of dough formulations in different shapes and sizes. Depending on the particular dough, and on the ultimate product characteristics desired, the relative effects of different types of energy transfer can be altered as needed. Thus the operator has the choice of various fluid processing media, of different temperatures, pressures and flow rates for such media, of different gun conditions such as barrel temperature, inclination, and rotational speed, and of different relative contributions by any of such factors toward the residence time of the material in the gun and the final product characteristics. Thus if external toasting or coloring require greater radiation or direct conduction, the necessary adjustments can be made to increase residence time or degree of energy transfer from the gun barrel itself. If quicker initial heating is desired, the turbulence temperature and/or volume rate of input of the processing fluid can be adjusted. If more or less chemical effect is desired, the relative proportions of air or other fluids can be varied.

To further illustrate the features of the present invention the following examples are given:

*Examples*

|  | Oat cereal dough rings | | | Thin potato flakes |
|---|---|---|---|---|
|  | No. 1 | No. 2 | No. 3 | No. 4 |
| Product: |  |  |  |  |
| Preheat (° F.) | 180 | 168 | 170 | None |
| Moisture (percent by weight) | 12.6 | 13.8 | 14.5 | 14 |
| Feed rate (lbs./min.) | 13 | 21 | 98 | 1 |
| Processing fluid(s): |  |  |  |  |
| At inlet 46 | Steam | Air | Steam | Steam |
| Pressure (p.s.i.) | 90 | 88 | 104 | 62 |
| Temperature (° F.) | 332 | 80 | 330 | 295 |
| Flow rate (lbs./hr.) | 231 | 115 | 270 | 270 |
| At inlet 48 | Steam | Air | Air | Steam |
| Pressure | 90 | 88 | 121 | 62 |
| Temperature | 332 | 75 | 75 | 295 |
| Flow rate | 231 | 115 | 160 | 270 |
| At inlet 50 | Steam | Steam | Steam | Steam |
| Pressure | 86 | 87 | 92 | 53 |
| Temperature | 332 | 365 | 330 | 295 |
| Flow rate | 474 | 640 | 528 | 475 |
| Gun conditions: |  |  |  |  |
| 1st zone temp. (° F.) | 900 | 860 | 860 | 620 |
| 2nd zone temp. (° F.) | 900 | 820 | 820 | 640 |
| 3rd zone temp. (° F.) | 880 | 800 | 790 | 605 |
| Angle below horizontal (°) | 4 | 2½ | 3 | 3½ |
| Rotation (r.p.m.) | 120 | 110 | 110 | 116 |
| Puffing nozzle orifice (diam.) | ½" | ½" | ½" | ⅝" |
| Barrel size (diam. x length) | 4" x 24' | 4" x 24' | 4" x 24' | 4" x 24' |
| Barrel pressure | 80 | 82 | 92 | 47 |

In certain of the foregoing examples the dough bodies were preheated as indicated before entering the inlet valve. In other cases, such as shown in Example 4, preheating may be omitted and the conditions adjusted to provide all the desired heating within the gun. While all these examples were run with a 4" by 24' gun barrel, other gun sizes have also been used successfully of both larger and smaller diameter and different ratios of diameter to length.

These examples are only some of many test runs which indicate the possibility of a substantial range of variation in the operating conditions for various products. In those cases where a combination of quick cooking by steam and further processing by radiation and conduction from the barrel is desired, we have found that super heated steam temperatures in the range from 225° to 350° F. and gun barrel temperatures from 600° to 1000° F. are preferable.

The foregoing specification sets forth the nature and principles of this invention, together with some of the ways in which the invention may be practiced.

Now, therefore, we claim:

1. The method of continuously processing and puffing particles of puffable material which comprises feeding the particles into an inlet of a pressurized processing chamber having said inlet at one end and a puffing orifice at the other end and a heated generally horizontally extending barrel therebetween, pressurizing said chamber by feeding a heated gaseous processing fluid into said chamber at a location providing immediate contact of the incoming fluid with said material particles as the particles and fluid enter the chamber at said one end while maintaining the processing fluid in a turbulent condition at the location of initial contact with the particles for effective initial action on the material, puffing the particles by continuously discharging both the fluid and the particles through said puffing orifice into a region of substantially lower pressure than the pressure within said chamber, and agitating the particles in heat transferring relation with the heated barrel while feeding the particles between said inlet and said puffing orifice.

2. The method of continuously processing and puffing preformed dough particles of puffable food material which comprises feeding the particles into an inlet of a pressurized processing chamber having said inlet at one end and a puffing orifice at the other end and a heated barrel therebetween, pressurizing said chamber by feeding a heated gaseous processing fluid into said chamber at a location providing immediate contact of the incoming fluid with said material particles as the particles and fluid enter the chamber at said one end while maintaining the processing fluid in a turbulent condition at the location of initial contact with the particles for effective initial action on the material, puffing the particles by continuously discharging both the fluid and the particles through said puffing orifice into a region of substantially lower pressure than the pressure within said chamber, agitating the particles in heat transferring relation with the heated barrel while feeding the particles between said inlet and said puffing orifice, and maintaining the heated barrel at a temperature in the range from 600° to 1000° F.

3. The method of claim 2 in which the fluid is superheated steam having an inlet temperature in the range up to substantially 365° F.

4. A continuous puffing apparatus comprising a processing cylinder having axially spaced inlet and outlet ends, means supporting at least part of the cylinder for rotation on its own axis with the axis inclined downwardly from the horizontal, means for heating the rotatable part of the cylinder, the outlet end of the cylinder including a constantly open puffing orifice through which particles of desired product may be discharged, pressure sealing inlet valve means located at the inlet end of the cylindrical chamber for feeding the particles into the chamber, and means for feeding a stream of pressurized gaseous processing fluid into the chamber, said fluid feeding means being located at said inlet end and arranged to direct said stream into immediate contact with said particles as they enter said chamber.

5. Puffing apparatus according to claim 4 in which said inlet valve means comprises a rotary valve member with separate individual pockets adapted to feed successive groups of particles downwardly into the chamber, said fluid feeding means including a discharge opening having a location and orientation directing a continuous stream of pressurized fluid into the successive valve pockets as they bring material to the chamber, thereby cleaning all particles out of said pockets and increasing the turbulence and processing efficiency within said chamber.

6. Puffing apparatus according to claim 4 having means for manual adjustment of the angular orientation of said cylinder axis below the horizontal.

7. A continuous processing and puffing apparatus comprising a processing cylinder having a high ratio of length to diameter and axially spaced inlet and outlet ends, means supporting the cylinder for rotation on its axis, means for rotating said cylinder, means for heating said cylinder to a desired temperature, pressure tight valve means at said inlet end for feeding particles of desired product into said cylinder, puffing means at said outlet end including a constantly open puffing orifice through which said particles may be discharged, means for feeding a stream of pressurizing gaseous processing fluid into the inlet end of the cylinder for immediate contact with said particles as they are fed in by said valve means, and adjusting means for independent control of the relative operating condition of at least one of the aforesaid means, other than said puffing means, for varying the relative processing effects of said different means on said product.

8. A continuous processing and puffing apparatus according to claim 7 in which said heating means includes a plurality of independently operable heater units spaced along said cylinder, and said adjusting means comprises means for independent adjustment of the heater units and the resulting cylinder wall temperatures at said spaced units.

9. A continuous processing and puffing apparatus according to claim 8 in which said means for independent adjustment of the heater units includes a radiation sensitive temperature sensing element receiving radiations from the cylinder near each heating unit and operatively connected to automatically control the operation of its corresponding heating unit.

10. A continuous processing and puffing apparatus according to claim 7 in which said adjusting means comprises means for independent control of said means for feeding processing fluid thereby controlling the relative processing effects of said fluid as compared to the processing effects from movement of said particles along said heated cylinder.

11. A continuous processing and puffing apparatus according to claim 7 in which said supporting means orients said cylinder at a slight angle downwardly from the horizontal and in which said adjusting means includes means for independent adjustment of the vertical angular position of the axis of said cylinder and further means for independent adjustment of each of said cylinder rotating means, heating means, inlet valve feeding means and fluid feeding means.

12. A continuous processing and puffing apparatus comprising means defining a processing chamber having longitudinally spaced inlet and outlet portions, a generally horizontally extending chamber wall portion therebetween, and means for pressurizing said chamber, said outlet portion including a constantly open puffing orifice through which particles of desired product may be discharged and puffed as they leave the pressurized chamber, said inlet portion including pressure sealing inlet valve means for feeding the particles into the chamber, said pressurizing means including means for feeding a heated pressurized gaseous processing fluid into the chamber at said inlet portion, said fluid feeding means being located at said inlet portion and having a construction and orientation directing said fluid in a turbulent condition into immediate contact with the particles as they enter said chamber, and means for moving said chamber wall portion and thereby agitating the particles in heat transferring relation with said wall portion while the particles move between said inlet and said puffing orifice.

13. The method of continuous cooking and puffing of puffable food particles which comprises feeding the particles into an inlet of a pressurized processing chamber having said inlet at one end and a puffing orifice at the other end and a heated internally cylindrical barrel therebetween, pressurizing said chamber by feeding a heated gaseous processing fluid into said chamber at a location providing immediate contact of the incoming fluid with said particles as the particles and fluid enter the chamber at said one end, puffing the particles by continuously discharging both the fluid and the particles through said puffing orifice into a region of substantially lower pressure than the pressure within said chamber, feeding the gaseous processing fluid from said inlet to said orifice at a total volume rate which is less than that required for pneumatic conveying of the particles within the barrel solely by such fluid, and moving the particles in contact with the heated barrel by rotating the barrel around its longitudinal axis.

14. The method of continuous cooking and puffing of puffable food particles which comprises feeding the particles into an inlet of a pressurized processing chamber having said inlet at one end and a puffing orifice at the other end and a heated, generally cylindrical barrel therebetween, pressurizing said chamber by feeding a heated gaseous processing fluid into said chamber at a location providing immediate contact of the incoming fluid with said particles as the particles and fluid enter the chamber at said one end, puffing the particles by continuously discharging both the fluid and the particles through said puffing orifice into a region of substantially lower pressure than the pressure within said chamber, and conveying the particles through the chamber from said inlet to said orifice by a combination of steps including:
 (a) feeding the gaseous processing fluid from said inlet to said orifice at a total volume rate providing a partial conveying action, but which is less than that required for pneumatic conveying of the particles within the barrel solely by such fluid, and
 (b) rotating the barrel around its longitudinal axis, while maintaining said barrel axis at an angular orientation (from said inlet to said puffing orifice) which is below the horizontal.

References Cited by the Examiner

UNITED STATES PATENTS

| | | | |
|---|---|---|---|
| 1,235,409 | 7/1917 | Aldrich | 137—240 |
| 1,442,304 | 2/1923 | Spencer | 99—238 |
| 1,639,909 | 8/1927 | Suzuki | 99—238 |
| 1,933,158 | 10/1933 | Bohn | 99—82 |
| 2,060,408 | 11/1936 | Wood | 99—237 |
| 2,116,212 | 5/1938 | Plews | 99—238 |
| 2,124,746 | 7/1938 | Plews | 99—82 |
| 2,278,701 | 4/1942 | Karr | 99—237 X |
| 2,622,985 | 12/1952 | Haughey et al. | 99—238 X |
| 2,660,564 | 11/1953 | Davis | 252—378 X |
| 2,838,401 | 6/1958 | Gates | 99—238 X |
| 2,909,114 | 10/1959 | Bok | 99—237 |
| 3,037,940 | 6/1962 | Pixley et al. | 252—378 |

FOREIGN PATENTS 357,515  9/1931  Great Britain.

ROBERT E. PULFREY, *Primary Examiner.*

TOBIAS E. LEVOW, NORTON ANSHER, JEROME SCHNALL, *Examiners.*

UNITED STATES PATENT OFFICE
CERTIFICATE OF CORRECTION

Patent No. 3,231,387                          January 25, 1966

Takuzo Tsuchiya et al.

It is hereby certified that error appears in the above numbered patent requiring correction and that the said Letters Patent should read as corrected below.

Column 3, line 12, for "on" read -- of --; column 5, line 44, for "66" read -- 166 --; columns 9 and 10, in the table, fourth column, line 3 thereof, for "98" read -- 18 --.

Signed and sealed this 27th day of December 1966.

(SEAL)
Attest:

ERNEST W. SWIDER                          EDWARD J. BRENNER
Attesting Officer                              Commissioner of Patents